Feb. 6, 1951
G. G. BERNARD
2,540,646
CATHODE-RAY TUBE MODULATION CIRCUITS
FOR TELEVISION RECEIVERS
Filed March 16, 1949
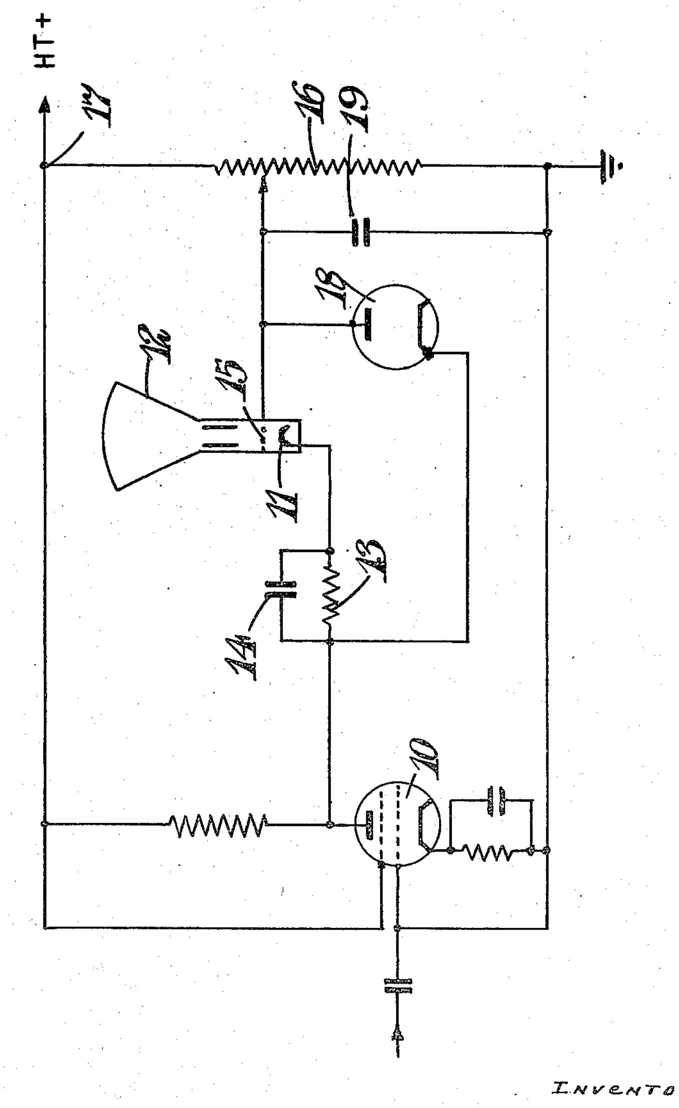
INVENTOR
Geoffrey G. Bernard
By Watson, Cole, Grindle & Watson Patented Feb. 6, 1951

2,540,646

UNITED STATES PATENT OFFICE 2,540,646

CATHODE-RAY TUBE MODULATION CIRCUITS FOR TELEVISION RECEIVERS

Geoffrey George Bernard, London, England, assignor to Scophony Limited, Wembley, England, a British company Application March 16, 1949, Serial No. 81,702
In Great Britain June 9, 1948

1 Claim. (Cl. 315—22)

This invention relates to cathode ray tube modulation circuits for television receivers and has for its principal object to provide an improved circuit for limiting the brilliance of signals on the cathode ray tube of the receiver.

In order to prevent excessive brilliance of the cathode ray tube screen in the whitest part of the picture, it has heretofore been the practice to connect a signal limiter, e. g. a diode with a negatively biased anode, across the video signal input circuit of the cathode ray tube to limit the peak amplitude of the picture signal. However, the brilliance of the signal on the screen of the cathode ray tube depends both on the video signal voltage applied to the tube and also on the bias voltage applied to the grid of the tube. Hence circuits of the form described above which only limit the amplitude of the video signal voltage do not prevent excessive brilliance if the bias on the tube should be reduced.

It is an object of this invention to provide a circuit for limiting the actual peak brilliance of the signal on the screen and not the peak amplitude of the picture signal applied to the tube.

One embodiment of the invention is shown in the accompanying drawing which is a diagram of a circuit for applying signals to a cathode ray tube of a television receiver.

The picture signal voltage is developed in the conventional manner at the plate of the video amplifier tube 10 as a negative going voltage with respect to earth. The plate of this tube is connected to the cathode 11 of the cathode ray tube 12 by a circuit comprising a resistor 13 in parallel with a condenser 14. The grid 15 of the cathode ray tube is biased negatively with respect to the cathode 11 by an adjustable potentiometer circuit, the grid 15 being connected to the adjustable tap of the potentiometer 16, the ends of which are connected respectively to the H. T. supply lead 17 and ground. The grid 15 is also connected to the anode of a diode 18, the cathode of which is connected to the plate of the video amplifier tube 10. A by-pass condenser 19 is connected between the grid 15 of the cathode ray tube and ground.

The method of operation of this circuit is as follows:

The negative going picture signals are applied to the cathode 11 of the cathode ray tube 12 through the condenser 14. The cathode current of the tube 12 passes through the resistor 13 and so develops across the resistor a bias potential having a magnitude depending on the mean cathode current taken by the cathode ray tube.

This bias potential is applied to the cathode of the diode 18. The anode of the diode is connected to the grid 15 of the cathode ray tube and is therefore maintained at a potential negative with respect to that of the cathode 11 of the cathode ray tube by the bias potentiometer 16. The diode 18 will become conductive when its anode is positive with respect to its cathode, that is when the negative picture signal voltage exceeds a value dependent on the bias applied to the grid 15 of the cathode ray tube. The diode therefore limits the voltage between the cathode 11 and grid 15 and thus prevents excessive brilliance of the tube.

In a television receiver, the bias on the cathode ray tube is usually provided with an external manually adjustable control so that the brightness of the picture may be readily adjusted to suit the viewing conditions, e. g. the amount of external light, etc. It will be particularly noted that the circuit described above limits the amplitude of the video picture signals provided by the video amplifier stage to a value dependent on the amount of bias on the cathode ray tube. Hence the circuit prevents excessive brilliance of the tube even if the bias is reduced by too great an extent and thus greatly facilitates the adjustment of the receiver.

It will be appreciated that although one preferred embodiment has been described, many variations or modifications will be readily apparent to those skilled in the art. Thus, for example, the diode might be replaced by another suitable form of rectifier. Also it will be clear that a similar form of circuit could be used in the case in which positive-going modulation signals are applied to the grid of the cathode ray tube instead of negative going signals being applied to the cathode.

I claim:

In a television receiver, the combination of a cathode-ray-tube, means for applying a video-signal-potential between the grid and cathode of the cathode-ray-tube, means for applying a variable bias-potential between said grid and said cathode, a bias resistor in series with said cathode, a by-pass condenser in parallel with said bias resistor, a rectifier having an anode and a cathode, means connecting the anode of the rectifier to the grid of the cathode-ray-tube, and means connecting the cathode of the rectifier to the end of the bias resistor remote from the cathode of the cathode-ray-tube.

GEOFFREY GEORGE BERNARD.

(References on following page)

REFERENCES CITED

The following references are of record in the file of this patent:

UNITED STATES PATENTS

| Number | Name | Date |
|---|---|---|
| 2,222,943 | George | Nov. 26, 1940 |
| 2,227,197 | Percival | Dec. 31, 1940 |
| 2,295,059 | Smyth | Sept. 8, 1942 |
| 2,303,924 | Faudell | Dec. 1, 1942 |
| 2,339,857 | Holmes | Jan. 25, 1944 |
| 2,371,897 | Knick | Mar. 20, 1945 |
| 2,414,228 | Gottier | Jan. 14, 1947 |
| 2,456,809 | Bedford et al. | Dec. 21, 1948 |
| 2,470,048 | Norton | May 10, 1949 |
| 2,472,209 | Hall | June 7, 1949 |